United States Patent
Caterina et al.

(10) Patent No.: US 8,258,443 B2
(45) Date of Patent: Sep. 4, 2012

(54) HEATING UNIT FOR WARMING PALLETS

(75) Inventors: Thomas Caterina, Boise, ID (US); David Naylor, Draper, UT (US)

(73) Assignee: 417 and 7/8, LLC, Park City, UT (US)

( * ) Notice: Subject to any disclaimer, the term of this patent is extended or adjusted under 35 U.S.C. 154(b) by 452 days.

(21) Appl. No.: 12/119,434

(22) Filed: May 12, 2008

(65) Prior Publication Data

US 2008/0290086 A1 Nov. 27, 2008

Related U.S. Application Data

(63) Continuation-in-part of application No. 11/835,641, filed on Aug. 8, 2007, which is a continuation-in-part of application No. 11/744,163, filed on May 3, 2007, which is a continuation-in-part of application No. 11/218,156, filed on Sep. 1, 2005, now Pat. No. 7,230,213, application No. 12/119,434, which is a continuation-in-part of application No. 11/422,580, filed on Jun. 6, 2006, and a continuation-in-part of application No. 11/218,156, filed on Sep. 1, 2005, now Pat. No. 7,230,213, said application No. 11/422,580 is a continuation-in-part of application No. 11/344,830, filed on Feb. 1, 2006, now Pat. No. 7,183,524.

(60) Provisional application No. 60/654,702, filed on Feb. 17, 2005, provisional application No. 60/656,060, filed on Feb. 23, 2005, provisional application No. 60/688,146, filed on Jun. 6, 2005.

(51) Int. Cl.
*H05B 3/06* (2006.01)
*F28F 7/00* (2006.01)

(52) U.S. Cl. ........ 219/530; 219/528; 219/529; 219/211; 219/212; 219/543; 219/544; 219/545; 219/548; 219/549; 219/552; 165/46

(58) Field of Classification Search .......... 219/528–530, 219/211–212, 544–3, 545, 548–9, 552–3; 165/46
See application file for complete search history.

(56) References Cited

U.S. PATENT DOCUMENTS
1,455,297 A 5/1923 Hadley
(Continued)

FOREIGN PATENT DOCUMENTS
JP 04350257 12/1992
(Continued)

OTHER PUBLICATIONS
"Thawzall Heater" http://www.themachinecompany.com/faq.htm.
(Continued)

*Primary Examiner* — Shawntina Fuqua
(74) *Attorney, Agent, or Firm* — Workman Nydegger (57) ABSTRACT

A heating unit for use in heating buckets or barrels. The heating unit includes a first pliable cover layer and a second pliable cover layer. A pliable electrical heating element is disposed between the first and the second cover layers and configured to convert electrical energy to heat energy and to distribute the heat energy. The pliable electrical heating element includes a heat generating element for converting electrical current to heat energy and a heat spreading element comprising carbon thermally coupled to the heat generating element. The heating unit further includes a thermal insulation layer. The heating unit includes a receiving power connector electrically connected to the heat generating element. The heating unit further includes one or more fasteners allowing the heating unit to be wrapped around a bucket or barrel and secured by the one or more fasteners.

20 Claims, 2 Drawing Sheets

U.S. PATENT DOCUMENTS

| | | |
|---|---|---|
| 1,486,412 A | 3/1924 | Biddlecom |
| 2,666,840 A | 1/1954 | Poirier |
| 2,745,942 A | 5/1956 | Cohen |
| 3,380,087 A | 4/1968 | Petty |
| 3,417,229 A | 12/1968 | Shomphe |
| 3,438,069 A | 4/1969 | Long |
| 3,510,547 A | 5/1970 | Eisler |
| 3,649,725 A | 3/1972 | Olson |
| 3,659,077 A | 4/1972 | Olson |
| 3,694,622 A | 9/1972 | Bentley |
| 3,729,614 A | 4/1973 | Martinet |
| 3,812,320 A | 5/1974 | Borgren |
| 3,868,825 A | 3/1975 | Boyce |
| 3,897,928 A | 8/1975 | Eisler |
| 3,968,348 A | 7/1976 | Stanfield |
| 3,988,791 A | 11/1976 | Simon |
| 4,000,815 A | 1/1977 | Wingbro et al. |
| 4,060,710 A | 11/1977 | Reuter |
| 4,091,266 A | 5/1978 | Ito |
| 4,238,105 A | 12/1980 | West |
| 4,244,411 A | 1/1981 | Karlstrom et al. |
| 4,303,074 A | 12/1981 | Bender |
| 4,316,080 A | 2/1982 | Wroblewski |
| 4,423,694 A | 1/1984 | Senneville |
| 4,457,491 A | 7/1984 | Dudman |
| 4,485,297 A | 11/1984 | Grise |
| 4,607,154 A | 8/1986 | Mills |
| 4,810,859 A | 3/1989 | Anabtawi |
| 4,832,881 A | 5/1989 | Arnold |
| 4,899,031 A | 2/1990 | Dyer |
| 4,935,602 A | 6/1990 | Bravo |
| 4,967,057 A | 10/1990 | Bayless |
| 5,005,531 A | 4/1991 | Nelson |
| 5,181,006 A | 1/1993 | Shafe |
| 5,198,063 A | 3/1993 | Howard |
| 5,371,340 A | 12/1994 | Stanfield |
| 5,451,747 A | 9/1995 | Sullivan |
| 5,550,350 A | 8/1996 | Barnes |
| 5,590,478 A | 1/1997 | Furness |
| 5,591,365 A | 1/1997 | Shields |
| 5,614,292 A | 3/1997 | Saylor |
| 5,780,367 A | 7/1998 | Handwerker |
| 5,824,996 A | 10/1998 | Kochman |
| 5,827,050 A | 10/1998 | Price |
| 5,830,809 A | 11/1998 | Howard |
| 5,854,470 A | 12/1998 | Silva |
| 5,974,820 A | 11/1999 | Boyd |
| 5,974,830 A | 11/1999 | Colero |
| 5,986,243 A | 11/1999 | Campf |
| 6,051,811 A | 4/2000 | Hardison |
| 6,051,812 A | 4/2000 | Walker |
| 6,057,530 A | 5/2000 | Gurevich |
| 6,160,246 A | 12/2000 | Rock |
| 6,180,929 B1 | 1/2001 | Pearce |
| 6,184,496 B1 | 2/2001 | Pearce |
| 6,189,487 B1 | 2/2001 | Owen |
| 6,211,493 B1 | 4/2001 | Bouman |
| 6,222,160 B1 | 4/2001 | Remke |
| 6,245,400 B1 | 6/2001 | Tzeng |
| 6,279,856 B1 | 8/2001 | Rutherford |
| 6,294,761 B1 | 9/2001 | Diederich |
| 6,294,768 B1 | 9/2001 | Liebich |
| 6,303,905 B1 | 10/2001 | Chiles |
| 6,330,986 B1 | 12/2001 | Rutherford et al. |
| 6,330,988 B1 | 12/2001 | Liu |
| 6,392,209 B1 | 5/2002 | Oppitz |
| 6,426,488 B2 | 7/2002 | Schielke |
| 6,426,489 B1 | 7/2002 | Elsasser |
| 6,432,336 B1 | 8/2002 | Mercuri |
| 6,452,138 B1 | 9/2002 | Kochman |
| 6,482,520 B1 | 11/2002 | Tzeng |
| 6,483,087 B2 | 11/2002 | Gardner |
| 6,503,626 B1 | 1/2003 | Norley |
| 6,631,603 B2 | 10/2003 | Zornes |
| 6,657,170 B2 | 12/2003 | Clothier |
| 6,664,520 B2 | 12/2003 | Clothier |
| 6,667,100 B2 | 12/2003 | Rutherford et al. |
| 6,673,284 B2 | 1/2004 | Mercuri |
| 6,673,289 B2 | 1/2004 | Reynolds |
| 6,740,381 B2 | 5/2004 | Day |
| 6,746,768 B2 | 6/2004 | Greinke |
| 6,782,640 B2 | 8/2004 | Westin |
| 6,797,251 B1 | 9/2004 | Bennett |
| 6,841,250 B2 | 1/2005 | Tzeng |
| 6,848,200 B1 | 2/2005 | Westin |
| 6,855,915 B2 | 2/2005 | Gehring |
| 6,886,233 B2 | 5/2005 | Rutherford |
| 6,897,417 B1 | 5/2005 | Usselman |
| 6,943,320 B1 | 9/2005 | Bavett |
| 6,982,874 B2 | 1/2006 | Smalc |
| 7,049,559 B2 | 5/2006 | Ishii |
| 7,108,055 B2 | 9/2006 | Krassowski |
| 7,161,809 B2 | 1/2007 | Ford |
| 7,166,912 B2 | 1/2007 | Tzeng |
| 7,182,222 B2 | 2/2007 | Prabucki |
| 7,183,524 B2 | 2/2007 | Naylor |
| 7,186,309 B2 | 3/2007 | Mercuri |
| 7,230,213 B2 | 6/2007 | Naylor |
| 7,232,601 B2 | 6/2007 | Mercuri |
| 7,393,577 B2 | 7/2008 | Day |
| 7,393,587 B2 | 7/2008 | Krassowski |
| 2001/0031350 A1 | 10/2001 | Day et al. |
| 2002/0069603 A1 | 6/2002 | Zornes |
| 2002/0164483 A1 | 11/2002 | Mercuri |
| 2003/0046831 A1 | 3/2003 | Westin |
| 2003/0085215 A1 | 5/2003 | Rix |
| 2004/0035853 A1 | 2/2004 | Pais |
| 2004/0221529 A1 | 11/2004 | Zornes |
| 2005/0074593 A1 | 4/2005 | Day et al. |
| 2006/0191902 A1* | 8/2006 | Naylor ........................ 219/528 |
| 2006/0191903 A1 | 8/2006 | Naylor et al. |
| 2006/0289000 A1 | 12/2006 | Naylor |
| 2006/0289468 A1 | 12/2006 | Seibert et al. |
| 2007/0181561 A1 | 8/2007 | Turletes |
| 2007/0262073 A1 | 11/2007 | Naylor |
| 2009/0302023 A1 | 12/2009 | Caterina |
| 2011/0006080 A1 | 1/2011 | Naylor |
| 2011/0174802 A1 | 7/2011 | Naylor |

FOREIGN PATENT DOCUMENTS

| | | |
|---|---|---|
| JP | 06129095 | 5/1994 |
| JP | 2001123667 | 5/2001 |

OTHER PUBLICATIONS

"Q Foil Performance" http://www.rotabolt.com.html/qfoil_1.html.

"Q Foil Technology" http://www.rotabolt.com.html/qfoil.html.

"Q Foil Product Features" http://www.rotabolt.com.html/qfoil_2.html.

"Thawzall Product Selection" http://www.themachinecompany.com/products.htm.

"Ground Heaters S3000" http://www.groundheaters.com/s3000.htm.

"How it Works" http://www.groundheaters.com/how_it_works.htm.

"GrafTech" http://www.graphtech.com.

"FP Parallel Constant Watt Heating Cable" Thermon Manufacturing Co.

"SCS Concrete Curing Blankets" http://www.scsincorporated.com/curingblankets.htm.

"Mauritzon Concrete Curing Blankets" http://www.mauritzononline.com.concretecure.html.

"Concrete-Curing-Blankets.Com" http://concrete-curing-blankets.com.

"Janell Concrete Curing Methods" http://www.janell.com/engineering_data.html.

"GrafTech Material Safety Data Sheet" May 17, 2005.

Concrete Curing Technology, Inc. "Instructions for Use of Pad".

"Electrical Floor Heating", portion of catalog from Heating Catalog, http://www.wattsradiant.com.

"The Future Looks Radiant", Full Line Radiant Catalong, http://www.wattsradiant.com 2007.

"Hotmesh", various pages from website, http://www.worldscientificdevelopment.com/hotmesh/motivation.html.

"GO Polymers" http://www.gopolymers.com/index.php?module-abs.

Julian Norley and Gary Chen "GrafTech High Performance, Lightweight Graphite Heat Sinks/Spreaders" IEEE 2002.

Grafoil Flexible Graphite "Typical Grafoil Sheet Properties".

"Springfield Wire Inc." http://www.springfield-wire.com/category.cfm?Category=21.

Office Action dated Jan. 25, 2006 cited in related Patent No. 7,230,213.

Office Action dated Aug. 28, 2006 cited in related Patent No. 7,230,213.

Notice of Allowance dated Feb. 7, 2007 cited in related Patent No. 7,230,213.

Office Action dated Jun. 22, 2006 cited in related Patent No. 7,183,524.

Notice of Allowance dated Nov. 29, 2006 cited in related Patent No. 7,183,524.

Office Action dated Mar. 15, 2007 cited in related U.S. Appl. No. 11/422,580.

Office Action dated Jul. 27, 2007 cited in related U.S. Appl. No. 11/422,580.

GrafTech International "Dramatically Improve Your Radiant Floor Heating Performance" Copyright 2008 GrafTech International Holdings Inc. 1 page.

Office Action dated Dec. 10, 2008 cited in U.S. Appl. No. 11/422,580.

U.S. Appl. No. 12/258,249, filed on Oct. 24, 2008.
U.S. Appl. No. 12/212,529, filed on Sep. 17, 2008.
U.S. Appl. No. 12/264,460, filed on Nov. 4, 2008.
U.S. Appl. No. 12/258,240, filed on Oct. 24, 2008.
U.S. Appl. No. 12/264,469, filed on Nov. 4, 2008.
U.S. Appl. No. 12/264,480, filed on Nov. 4, 2008.
U.S. Appl. No. 12/264,493, filed on Nov. 4, 2008.
U.S. Appl. No. 12/260,021, filed on Oct. 28, 2008.
U.S. Appl. No. 11/422,580, filed Sep. 1, 2005, Naylor.
U.S. Appl. No. 11/744,163, filed May 3, 2007, Naylor.
U.S. Appl. No. 11/835,641, filed Aug. 8, 2007, Naylor.
U.S. Appl. No. 12/436,905, filed May 7, 2009, Caterina.

International Search Report from PCT/US05/37414.
Written Opinion from PCT/US05/37414.
International Preliminary Report on Patentability from PCT/US05/37414.
International Search Report from PCT/US06/04437.
Written Opinion from PCT/US06/04437.
International Preliminary Report on Patentability from PCT/US06/04437.
International Search Report from PCT/US08/62481.
Written Opinion from PCT/US08/62481.
International Preliminary Report on Patentability from PCT/US08/62481.
International Search Report from PCT/US08/62479.
Written Opinion from PCT/US08/62479.
International Preliminary Report on Patentability from PCT/US08/62479.
International Search Report from PCT/US09/43443.
Notice of Allowance dated Nov. 16, 2009 cited in related U.S. Appl. No. 11/422,580.
U.S. Appl. No. 12/433,974, dated May 1, 2009, Caterina.
U.S. Appl. No. 11/422,580, dated Nov. 16, 2009, Notice of Allowance.
U.S. Appl. No. 11/422,580, dated Apr. 15, 2010, Notice of Allowance.
U.S. Appl. No. 11/422,580, dated Aug. 17, 2010, Notice of Allowance.
U.S. Appl. No. 11/422,580, dated Nov. 22, 2010, Notice of Allowance.
U.S. Appl. No. 11/835,641, dated Sep. 1, 2010, Office Action.
U.S. Appl. No. 12/258,249, dated May 7, 2012, Office Action.
U.S. Appl. No. 12/875,305, dated Mar 8, 2012, Office Action.
U.S. Appl. No. 12/258,240, dated Mar. 14, 2012, Office Action.
U.S. Appl. No. 12/264,480, dated Mar. 14, 2012, Office Action.
U.S. Appl. No. 12/212,529, dated Sep. 23, 2011, Office Action.
U.S. Appl. No. 12/875,313, filed Sep. 3, 2010, Naylor.

* cited by examiner

HEATING UNIT FOR WARMING PALLETS

CROSS-REFERENCE TO RELATED APPLICATIONS

This application is a continuation in part of co-pending U.S. application Ser. No. 11/835,641 filed on Aug. 8, 2007 titled GROUNDED MODULAR HEATED COVER, which is a continuation in part of U.S. patent application Ser. No. 11/744,163 filed May 3, 2007, which is a continuation in part of U.S. patent application Ser. No. 11/218,156 filed Sep. 1, 2005, now U.S. Pat. No. 7,230,213, issued on Jun. 12, 2007 which claims priority to: U.S. Provisional Patent Application 60/654,702 filed on Feb. 17, 2005, titled A MODULAR ACTIVELY HEATED THERMAL COVER; U.S. Provisional Patent Application 60/656,060 filed Feb. 23, 2005 titled A MODULAR ACTIVELY HEATED THERMAL COVER; and U.S. Provisional Patent Application 60/688,146 filed Jun. 6, 2005, titled LAMINATE HEATING APPARATUS each of which is incorporated herein by reference in their entireties. This application is also a continuation in part of co-pending U.S. application Ser. No. 11/422,580 filed on Jun. 6, 2006, titled "A RADIANT HEATING APPARATUS" which claims priority to U.S. Provisional Patent Application 60/688,146 filed Jun. 6, 2005, titled LAMINATE HEATING APPARATUS. U.S. application Ser. No. 11/422,580 filed on Jun. 6, 2006, titled "A RADIANT HEATING APPARATUS" is a Continuation in Part of U.S. patent application Ser. No. 11/218,156, filed Sep. 1, 2005, now U.S. Pat. No. 7,230,213 issued on Jun. 12, 2007, which claims priority to: U.S. Provisional Patent Application 60/654,702 filed on Feb. 17, 2005, titled A MODULAR ACTIVELY HEATED THERMAL COVER; U.S. Provisional Patent Application 60/656,060 filed Feb. 23, 2005 titled A MODULAR ACTIVELY HEATED THERMAL COVER; and U.S. Provisional Patent Application 60/688,146 filed Jun. 6, 2005, titled LAMINATE HEATING APPARATUS. U.S. application Ser. No. 11/422,580 filed on Jun. 6, 2006, titled "A RADIANT HEATING APPARATUS" is also a Continuation in Part of U.S. patent application Ser. No. 11,344,830, filed Feb. 1, 2006 now U.S. Pat. No. 7,183,524 issued on Feb. 27, 2007, which claims priority to: U.S. Provisional Patent Application 60/654,702 filed on Feb. 17, 2005, titled A MODULAR ACTIVELY HEATED THERMAL COVER; U.S. Provisional Patent Application 60/656,060 filed Feb. 23, 2005 titled A MODULAR ACTIVELY HEATED THERMAL COVER; and U.S. Provisional Patent Application 60/688,146 filed Jun. 6, 2005, titled LAMINATE HEATING APPARATUS

BACKGROUND

Background and Relevant Art

Changing weather can affect driving surfaces. For example, the expansion and contraction of asphalt paved surfaces during winter months due to cycling of the temperature of the asphalt paved surfaces due to alternating exposure to sun and snow can cause potholes in the asphalt driving surfaces. To fix these potholes, asphalt patch is used, which is combination of oil, gravel, tar, and a number of other materials. To use the asphalt patch, the asphalt patch needs to be maintained above a given temperature to allow it to be properly applied to a pothole. However, cold weather conditions can make maintaining the asphalt patch above the given temperature a challenge.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed herein are embodiments of a heating unit for use in pallet warming or other warming applications. In particular, some embodiments may include a heating unit configured to substantially cover the entire outer perimeter of a pallet and items stored on the pallet, including substantially the full height of the pallet and items stored thereon. The heating unit includes a heating element which provides heat and spreads the heat over the surface of at least portions of the heating unit. The heating unit may also include an insulation layer to prevent heat from being lost to an environment external to the pallet.

Figure 1:
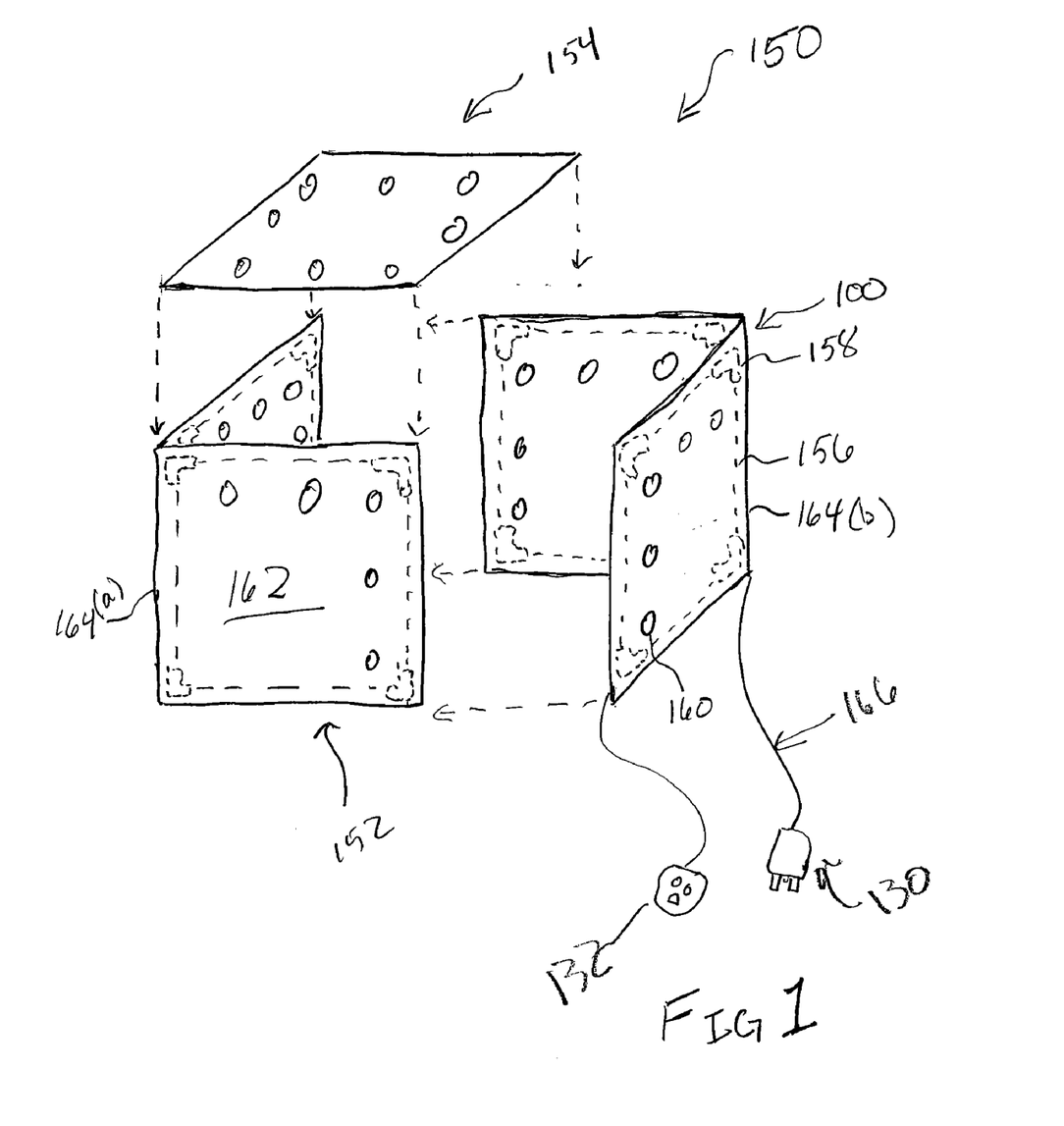
FIG. 1 illustrates an exploded view of a pallet warmer.

FIG. 1 illustrates one embodiment of a heating unit 150 configured as a pallet warmer. In particular, the heating unit 150 is a modular heating unit including, in this example, three modules. The heating unit 150 includes a heating module 100, a second module 152, and a lid module 154. The heating module 100 and the second module 152 each are designed to be supported on their edges when folded along a crease or seam 164(a) or 164(b) respectively, and to be configured to be coupled together, either securely or without securement, to substantially form the walls of a box. The modules may be fabricated to include the creases 164(a) or 164(b) which allow the modules 152 and 100 to be folded such that the modules 152 and 100 can be supported on their edges in a somewhat stable fashion. In addition, the box formed does not necessarily need to be a box with squared corners emanating from the creases 164(a) and 164(b), but rather, any suitable angles can be used.

The seams 164(a) and 164(b) may be formed in a number of different ways, such as by connecting two separate pieces together, or by performing operations on a single continuous piece. Such operations may include various heat welding operations or other appropriate operations.

In the example illustrated in FIG. 1, the modules 100, 152, and 154 each include fasteners 160. The fasteners can be used to securely couple the modules 100, 152, and 154 to each other. In some embodiments, the fasteners may be selectively coupleable to allow a panel, such as panel 162, or one of the other panels to be used as a door for accessing items being heated by the heating unit 150.

The modules 100 and 152 include support members arranged to provide rigidity to the modules 100 and 152. In particular, the modules 100 and 152 include rods 156 shown in phantom and elbows 158 also shown in phantom. The rods 156 can be inserted into hollow elbows 158 to form a support structure. As will be discussed later herein, the modules 100 and 152 may include a pliable cover and other flexible materials that may not sufficiently support the modules when the modules are supported by their edges. Thus, the support members can act as stiffeners to allow the modules to be better supported when supported by their edges.

The rods 156 may be constructed from materials such as fiberglass, plastic metal or other materials. Similarly, the elbows 158 may be fiberglass, plastic, metal (such as copper, aluminum, steel, etc) or other materials.

Figure 2:
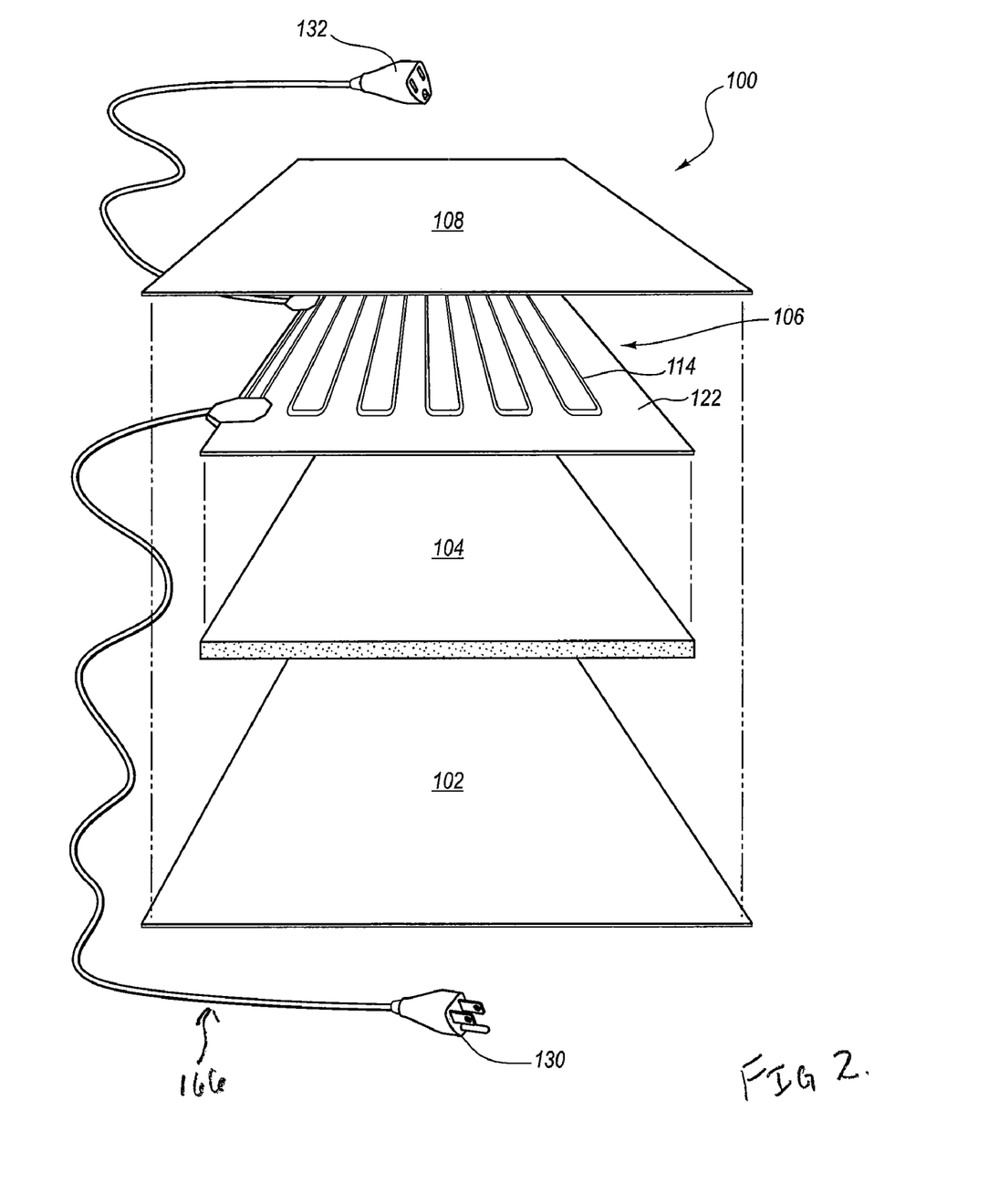
FIG. 2 an exploded view of a heating unit for use in a pallet warmer.

An example of components implemented in one embodiment is illustrated in FIG. 2. These Figures illustrate construction details of the heating module 100 of the heating unit 150 including materials used to assemble the heating module 100. FIG. 2 illustrates an exploded view illustrating that the heating module 100 of the heating unit 150 includes a first cover layer 102, an insulation layer 104, a heating element 106, and a second cover layer 108. The heating module 100 of the heating unit 150 further includes an incoming electrical connector 130 and an outgoing electrical connector 132. Some finished embodiments may be manufactured such that the insulation layer 104 and the heating element 106 may be sealed between the first cover layer 102 and the second cover layer 108. Sealing processes and details will be discussed in more detail below.

The following discussion will now treat additional details and embodiments of the various components of the heating module 100 of the heating unit 150. In some embodiments, the heating element 106 includes a heat generating element 114. The heat generating element 114 may be, for example, an electro-thermal coupling material or resistive element. In some embodiments, the heat generating strip may be a copper, copper alloy or other conductor. In one embodiment, the conductor is network of copper alloy elements configured to generate about 10 W of power per linear foot of the heat generating strip and to use about 58 feet of heat generating strip so as to draw a total of about 580 Watts. This may be achieved by selection of appropriate alloys for the heat generating element 114 in combination with selection of appropriate heat generating element wire sizes and circuit configurations. The conductor may convert electrical energy to heat energy, and transfer the heat energy to the surrounding environment. Alternatively, the heat generating element 114 may comprise another conductor, such as semiconductors, ceramic conductors, other composite conductors, etc., capable of converting electrical energy to heat energy. The heat generating element 114 may include one or more layers for electrical insulation, temperature regulation, and ruggedization.

Referring now to FIG. 2, the heat generating element 114 is illustrated with two heat generating conductors. One of the two conductors is connected to a first terminal of the incoming electrical connector 130 while the other conductor is connected to a second terminal of the electrical connector 130. The first and second terminals may be connected to electrical sources as appropriate, such as generator supplied AC or DC sources, batteries, power inverters, etc. The two conductors may be connected at one end to create a closed circuit allowing current to flow through the two conductors to generate heat.

The two conductors may be connected through a thermostat. In one embodiment, the thermostat includes a bi-metal strip based temperature control that disconnects the two conductors about a pre-determined temperature. Examples of predetermined temperatures may be between 70° F. to 100° F., and preferably operating at around 80° F. Notably, these are only examples, and other temperatures may be alternatively used. This can be used to regulate the temperature of the heating module 100 of the heating unit 150 to prevent overheating, or to maintain the temperature at a temperature of about the pre-determined temperature. Embodiments may be implemented where the temperature is determined by selecting a thermostat with a fixed temperature rating. Other embodiment may be implemented where the temperature setting of the thermostat can be adjusted to a predetermined temperature at manufacturing time. In some embodiments, the thermostat may be user accessible to allow a user to adjust the thermostat settings. While in the example illustrated the thermostat is located at the ends of the conductors of the heat generating element, it should be appreciated that in other embodiments the thermostat may be placed inline with one of the conductors. Additionally, some embodiments may include low voltage control circuitry including temperature control functionality, which controls application of power to the conductors to regulate temperature.

It should further be appreciated that embodiments may be implemented where other temperature or current protections are included. For example, embodiments may include magnetic and/or thermal circuit breakers, fuses, semiconductor based over-current protection, ground fault protection, arc fault protection, etc. In some embodiments, these may be located at the ends of the conductors or inline with one or more of the conductors as appropriate.

Additionally, controlling temperature may be accomplished by controlling the density of the heat generating element 114. This may be accomplished by controlling spacing between different portions of the heat generating element allowing for more or less material used for the heat generating element 114 to be included in the heating module 100 of the heating unit 150. This method may be especially useful when heat generating elements have a constant Wattage output per length of heat generating element. Thus a longer heat generating element 114 provides more heat than a shorter heat generating element 114.

The electrical heating element 106 may further include a heat spreading element. In general terms, the heat spreading element 122 is a layer of material capable of drawing heat from the heat generating element 114 and distributing the heat energy away from the heat generating element 114. Specifically, the heat spreading element 122 may comprise a metallic foil, wire mesh, carbon mesh, graphite, a composite material, or other material.

The heat-spreading element 122 in one embodiment is an electrically-conductive material comprising carbon. Graphite is one example of an electrically-conductive material comprising carbon. However, other suitable materials may include carbon-based powders, carbon fiber structures, or carbon composites. Those of skill in the art will recognize that material comprising carbon may further comprise other elements, whether they represent impurities or additives to provide the material with particular additional features. Materials comprising carbon may be suitable so long as they have sufficient thermal conductivity to act as a heat-spreading element. In one embodiment, the material comprising carbon comprises sufficient electrical conductivity to act as a ground connection, as will be discussed in more detail below. The heat-spreading element 122 may further comprise a carbon derivative, or a carbon allotrope.

One example of a material suitable for a heat spreading element 122 is a graphite-epoxy composite. The in-plane thermal conductivity of a graphite-epoxy composite material is approximately 370 watts per meter per Kelvin, while the out of plane thermal conductivity of the same material is 6.5 watts per meter per Kelvin. The thermal anisotropy of the graphite/epoxy composite material is then 57, meaning that heat is conducted 57 times more readily in the plane of the material than through the thickness of the material. This thermal anisotropy allows the heat to be readily spread out from the surface which in turn allows for more heat to be drawn out of the heating element 114.

The heat spreading element 122 may comprise a material that is thermally isotropic in one plane. The thermally isotropic material may distribute the heat energy more evenly and more efficiently. One such material suitable for forming the heat spreading element 122 is GRAFOIL® available from Graftech Inc. located in Lakewood, Ohio. In particular, GRAFOIL® is a flexible graphite sheet material made by taking particulate graphite flake and processing it through an intercalculation process using mineral acids. The flake is heated to volatilize the acids and expand the flake to many times its original size. The result is a sheet material that typically exceeds 98% carbon by weight. The sheets are flexible, lightweight, compressible resilient, chemically inert, fire safe, and stable under load and temperature. The sheet material typically includes one or more laminate sheets that provide structural integrity for the graphite sheet.

Due to its crystalline structure, GRAFOIL® is significantly more thermally conductive in the plane of the sheet than through the plane of the sheet. This superior thermal conductivity in the plane of the sheet allows temperatures to quickly reach equilibrium across the breadth of the sheet.

Typically, the GRAFOIL® will have no binder, resulting in a very low density, making the heated cover relatively light while maintaining the desired thermal conductivity properties.

Another product produced by GrafTech Inc. that is suitable for use as a heat spreading element 122 is eGraf® SpreaderShield™. The thermal conductivity of the SpreaderShield™ products ranges from 260 to 500 watts per meter per Kelvin within the plane of the material, and that the out of plane (through thickness) thermal conductivity ranges from 6.2 down to 2.7 watts per meter per Kelvin. The thermal anisotropy of the material ranges from 42 to 163. Consequently, a thermally anisotropic planar heat spreading element 122 serves as a conduit for the heat within the plane of the heat spreading element 122, and quickly distributes the heat more evenly over a greater surface area than a foil. The efficient planar heat spreading ability of the planar heat spreading element 122 also provides for a higher electrical efficiency, which facilitates the use of conventional power supply voltages such as 120 volts on circuits protected by 20 Amp breakers, instead of less accessible higher voltage power supplies. In some embodiments, the heat spreading element 122 is a planar thermal conductor. In certain embodiments, the graphite may be between 1 thousandths of an inch thick and 40 thousandths of an inch thick. This range may be used because within this thickness range the graphite remains pliable and durable enough to withstand repeated rolling and unrolling or folding and unfolding as the heating module 100 of the heating unit 150 is unrolled or unfolded for use and rolled or folded up for storage.

The heat spreading element 122 may comprise a flexible thermal conductor. In certain embodiments, the heat spreading element 122 is formed in strips along the length of the heat generating element 114. In alternative embodiments, the heat spreading element 122 may comprise a contiguous layer.

In some embodiments, the heat spreading element 122 may also include functionality for conducting electrical energy and converting electric energy to thermal energy in a substantially consistent manner throughout the heat spreading element. Graphite heat spreading elements may be particularly well suited for these embodiments. In such an embodiment, a heat generating element 114 may be omitted from the heating module 100 of the heating unit 150 as the heat spreading element 122 serves the purposes of conveying current, producing heat due to resistance, and evenly distributing the heat.

The small size and thickness of the graphite minimizes the weight of the heat spreading element 122. The graphite containing heat spreading element may be pliable such that the graphite can be rolled lengthwise without breaking the electrical path through the graphite.

In some embodiments, the heat spreading element 122 may include an insulating element formed of a thin plastic layer on both sides of the heat-spreading element 122. The insulating element may additionally provide structure to the heat-spreading material used in the heat spreading element 122. For example, the insulating element may be polyethylene terephthalate (PET) in the form of a thin plastic layer applied to both sides of a heat-spreading element 122 comprising graphite. Those of skill in the art will appreciate that such a configuration may result in the insulating element lending additional durability to the heat-spreading element 122 in addition to providing electrical insulation, such as electrical insulation from the electrical current in the heat generating element 114. It should be noted that the heating generating element 114 may include its own electrical insulation as well as described above.

In certain embodiments, the heat generating element 114 is in direct contact with the heat spreading element 122 to ensure efficient thermo-coupling. Alternatively, the heat spreading element 122 and the heat generating element 114 are integrally formed. For example, the heat spreading element 122 may be formed or molded around the heat generating element 114. Alternatively, heat generating element 114 and the heat spreading element 122 may be adhesively coupled.

Notably, while temperature may be controlled with the use of thermostats as described above, other embodiments may implement other design criteria to control temperature. For example, some embodiments may use appropriate selection of the heat spreading element 122 and/or the arrangement of the heat generating element 114. Illustratively, the heat retention properties of the heat spreading element 122 may be a factor in regulating temperatures at which a heating module 100 of the heating unit 150 will operate. Further, the density of the heat generating element 114 with respect to the size of the heating module 100 of the heating unit 150 or the heat spreading element 122 can be used set the operating temperatures or to regulate temperatures.

FIG. 2 illustrates an optional insulating layer 104. The insulating layer 104 may be used to reflect or direct heat or to prevent heat from exiting in an undesired direction. For example, it may be desirable to have all or most of the generated heat be directed towards a particular surface of the heating module 100 of the heating unit 150. In particular, it is desirable to direct heat towards palleted material in the heating unit 150 while directing heat away from an exterior environment in which the pallet and heating unit 150 is located. In the example illustrated, it may be desirable to have heat directed towards the side of the heating module 100 of the heating unit 150 which includes the second cover layer 108, while directing heat away from the side that includes the first cover layer 102. The insulating layer 104 may be used to accomplish this task.

The insulating layer 104 may include a sheet of polystyrene, cotton batting, Gore-Tex®, fiberglass, foam rubber, etc. In certain embodiments, the insulating layer 104 may allow a portion of the heat generated by the heat generating element 114 to escape the outside of the second cover layer 108 if desired. For example, the insulating layer 104 may include a plurality of vents to transfer heat to the second cover layer 108. In certain embodiments, the insulating layer 104 may be integrated with either the first cover layer 102 or the second cover layer 108. For example, the first cover layer 102 may include an insulation fill or batting positioned between two films of nylon.

FIG. 2 further illustrates first and second cover layers 102 to 108. In some embodiments, first and second cover layers 102 to 108 may comprise a textile fabric. The textile fabric may include natural or synthetic products. For example, the first and second cover layers 102 to 108 may comprise burlap, canvas, cotton or other materials. In another example, first and second cover layers 102 to 108 may comprise nylon, vinyl, or other synthetic textile material. The first and second cover layers 102 to 108 may comprise a thin sheet of plastic, metal foil, polystyrene, or other materials.

In manufacturing the heating module 100 of the heating unit 150, the heating element 106 and insulation layer 104 may be sealed between the first and second cover layers 102 and 108. As illustrated in FIGS. 1 and 2, the first and second cover layers 102 and 108 extend slightly beyond the heating element 106 and insulation layer 104. This allows the first and second cover layers 102 and 108 to be sealed, such as be using an adhesive, heat welding, or another other appropriate method or combination of methods.

Additionally, the heating module 100 of the heating unit 150 may be constructed such that the first and second cover layers 102 and 108 may include one or more fasteners 160 for hanging, securing, or connecting the heating module 100 of the heating unit 150. In some embodiments, the fasteners 160 may be attached or formed into the corners of the heating module 100 of the heating unit 150. Additionally, fasteners 160 may be distributed about portions of or the entire perimeter of the heating module 100 of the heating unit 150. In some embodiments, the fastener 160 is a hook and loop fastener such as Velcro®. For example, the heating module 100 of the heating unit 150 may include a hook fabric on one side and a loop fabric on an opposite side. In other alternative embodiments, the fastener 206 may include grommets, snaps, zippers, adhesives, or other fasteners. Further, additional objects may be used with the fasteners to accomplish fastening. For example, when grommets are used, elastic cord, such as bungee cord may be used to connect to grommets on opposite sides of the heating module 100 of the heating unit 150.

The embodiment shown in FIGS. 1 and 2 includes a 7 foot power cord 166 connected to the heat generating element 114. Other cord lengths may also be implemented within the scope of embodiments of the invention. The power cord may additionally be to an incoming electrical connector 130 such as an AC power plug, bare wire connector, alligator clip connectors, a cigarette lighter plug connector or other appropriate connector for connecting the power cord to a source of power.

Notably, some embodiments may be implemented with interchangeable incoming electrical connectors. For example, embodiments may include a kit which includes a heating module 100 of the heating unit 150 with a two pin auto connector. The kit may further include a wire without an additional connector connected to a mating two pin auto connector, a set of alligator clips connected to a mating two pin auto connector, and a cigarette lighter plug connected to a mating two pin auto connector. A user can then select an appropriate incoming electrical connector. For example, a user may select the wire without an additional connector if the heating unit is to be hard wired to an electrical system, such as an automobile, boat, or other electrical system. Cigarette lighter plugs or alligator clip connectors could be selected for more temporary connectors.

Some embodiments may also include various fault protections. For example, embodiments may include an incoming electrical connector 110 which includes ground fault circuit interruption capabilities so as to make the heating module 100 of the heating unit 150 suitable for use in wet or outdoor environment. Embodiments may include over current protection such as breakers or fuses. Embodiments may include arc fault circuit interruption capabilities to address problems related to fatigue of wires or crushing of wires.

Embodiments may further include provisions for grounding the heating module 100 of the heating unit 150. For example, the heating unit is illustrated in FIG. 2 as including an incoming electrical connector 130 in the form an AC plug, which includes two power terminals and a grounding terminal. The power cord 166 may include three conductors, one connected to each power terminal of the incoming electrical conductor, and the third connected the grounding terminal. The two conductors connected each to a respective power terminal connect as described above to the heat generating element 114. The third conductor may be connected so as to ground the heating module 100 of the heating unit 150. This may be done, for example by including an electrically conductive layer (not shown) in the heating module 100 of the heating unit 150 which is electrically connected to the grounding terminal.

In an alternative embodiment, due to the electrically conductive nature of the heat spreading element 122 when a graphite based material is used for the heat spreading element 122, the grounding terminal may be electrically coupled to the heat spreading element 122. This may be accomplished in one example, by using a ground coupling in the form of a spade connector or other connector which passes through a protective layer of the heat spreading element so as to be in electrical contact with the conductive portions of the heat spreading element 122. In one embodiment, the ground couplings comprise planar rectangular metal connection blades that would normally be used as the hot and/or neutral connection blades of a power coupling such as a power coupling which connects to a power source. In one embodiment, ground coupling spade connector further comprises barbs configured to cut into the heat-spreading element 122 and engage the heat-spreading element 122 such that the blade does not come loose. In alternative embodiments, the blade may be connected to the heat-spreading element 122 with an adhesive that does not electrically insulate the heat-spreading element 122 from the blade. In addition, the plane of the blade may be placed parallel to the plane of the heat-spreading element 122 such that a maximum amount of the surface area of the blade is in direct contact with the heat-spreading element 122. Such a configuration may increase the contact area between the two surfaces and results in a better electrical and physical connection. Furthermore, such a configuration can leverage the lower in-plane resistivity of the heat-spreading element 122.

Additionally, some embodiments may include an outgoing electrical connector 132. This may be used, for example to allow chaining of modules and/or heating units together. In the example illustrated, the outgoing electrical connector 132 is connected electrically to the incoming electrical connector 130 through conductors passing through the heating module 100 of the heating unit 150. Other embodiments may allow the incoming electrical connector 130 and outgoing electrical connector 132 to be more or less proximate to each other as appropriate.

A grounding terminal of the outgoing electrical connector 132 may be electrically connected to the grounding terminal of the incoming electrical connector 130. This may be accomplished by wiring the two terminals together or connecting both grounding connectors to the same grounding surface, such as a grounding layer, or to the heat spreading element 122 as described above.

Some embodiments may further include timing circuitry such that a user can select when heating should occur. The timer may be an electronic controlled device supplied by the electrical connector 130 and may include internal switching such as relays or solid state switches for supplying power to the heat generating element 114.

Returning once again to the description of FIG. 1, the second module 152 may be constructed in the same fashion as the heating module 100. Alternatively, the second module 152 may exclude certain elements, such as the entire heating element 106, or portions of the heating element 106 such as the heat generating element and the associated electrical connectors 130 and 132 and cords 166.

The lid module 154 may be fabricated in a fashion similar to the second panel 152. Namely, the lid module 154 may include all of the heating functionality of the heating module 100 or only insulating and or heat spreading functionality. In particular, some embodiments may be implemented where the lid module includes the heating element 106 along with the heat generating element 114 and heat spreading element 122. Alternatively, various elements may not be included in the lid module 154, including one or more of the heat generating element 114 and the heat spreading element 122. In some embodiments, the lid module 154 may be double insulated for better heat retention. Further, the lid module 154 may include flaps that can be secured to other portions of the heating unit 150 to prevent or inhibit wind from entering the heating unit 150.

The heating unit, in one embodiment is sized to be about 4 ft×4 ft×3 ft high so as to accommodate a standard 46 inch pallet and load stored thereon.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A heating unit for use in heating pallets, the heating unit comprising:
   a first module, wherein the first module comprises:
      a first pliable cover layer;
      a second pliable cover layer coupled to the first pliable cover layer;
      a pliable electrical heating element disposed between the first and the second cover layers and configured to convert electrical energy to heat energy and to distribute the heat energy, the pliable electrical heating element comprising:
         a heat generating element for converting electrical current to heat energy; and
         a heat spreading element comprising carbon thermally coupled to the heat generating element;
      a first thermal insulation layer positioned at one side of the pliable electrical heating element and between the first and the second cover layers;
      a receiving power connector electrically connected to the heat generating element, the receiving power connector configured to couple to an electrical power source;
      a first plurality of support members arranged to provide rigidity to at least a portion of the first module; and
      a first seam formed in the first module, the seam formed in a fashion that facilitates folding of the first module in a fashion which allows the support members to support the first module on an edge of the first module;
   a second module, wherein the second module comprises:
      a third pliable cover layer;
      a fourth pliable cover layer coupled to the first pliable cover layer;
      a second thermal insulation layer positioned between the first and the second cover layers;
      a plurality of support members arranged to provide rigidity to at least a portion of the second module; and
      a second seam formed in the second module, the seam formed in a fashion that facilitates folding of the second module in a fashion which allows the support members to support the second module on an edge of the first module;
   one or more fasteners coupled to or formed in at least one of the first, second, third, or fourth cover layers, and configured to allow the first and second modules to be connected in a fashion such that the first and second modules can be substantially arranged into the sides of a box; and
   a cover module configured to cover the top of the box and to retain heat in the box.

2. The heating unit of claim 1, wherein the heating unit comprises a thermostat configured to regulate an operating temperature of the heating unit.

3. The heating unit of claim 2, wherein the thermostat is set at a predetermined temperature.

4. The heating unit of claim 2, wherein the thermostat is user adjustable.

5. The heating unit of claim 1, wherein the heating unit comprises a timer configured to control when the heating unit supplies heat energy.

6. The heating unit of claim 1, wherein the heat spreading element comprises graphite.

7. The heating unit of claim 1, wherein the heat spreading element is thermally isotropic in one plane.

8. The heating unit of claim 1, further comprising an outgoing electrical connector electrically coupled to the receiving power connecter, the outgoing electrical connector being configured to couple to receiving power connectors of other heating units.

9. The heating unit of claim 1, wherein the one or more fasteners comprise grommets.

10. The heating unit of claim 1, wherein the one or more fasteners comprise snaps with mating portions of the snaps disposed on opposing portions of the heating unit.

11. A heating unit for use in heating a pallet of materials, the heating unit comprising:
   first, second, third, and fourth walls configured for coupling to one another to at least partially define an interior space of said heating unit in which said pallet of materials is received, the first, second, third, and fourth walls each comprising:
      a frame configured to provide structural support to the wall;

a heating component including a heat generating element for converting electrical current to heat energy and a heat spreading element thermally coupled to the heat generating element for substantially uniformly spreading the heat energy over the wall;

an insulation layer positioned at one side of the heating component and configured to direct heat energy to the interior space of said heating unit; and a first cover layer and a second cover layer coupled to the first cover layer to substantially enclose the frame, the heating component, and the insulation layer; and a lid configured to rest on the first, second, third, and fourth walls to cover and retain heat within the interior space of said heating unit.

12. The heating unit of claim 11, wherein the heating component of the first wall includes a receiving power connector electrically connected to the heat generating element of the heating component in the first wall, the receiving power connector being configured to couple to an electrical power source.

13. The heating unit of claim 12, wherein the heat generating elements of the heating components in the first and second walls are electrically connected to one another such that electrical power received by the receiving power connector of the first wall can be transferred from the heating component in the first wall to the heating component in the second wall.

14. The heating unit of claim 13, wherein the heating component of the second wall further includes an outgoing power connector electrically connected to the heat generating element of the heating component of the second wall.

15. The heating unit of claim 14, wherein the heating component of the third wall includes a receiving power connector electrically connected to the heat generating element of the heating component in the third wall, the receiving power connector configured to couple to the outgoing power connector of the second wall or to an electrical power outlet.

16. The heating unit of claim 15, wherein the heat generating elements of the heating components in the third and fourth walls are electrically connected to one another such that electrical power received by the receiving power connector of the third wall can be transferred from the heating component in the third wall to the heating component in the fourth wall.

17. The heating unit of claim 11, wherein at least one of the first, second, third, and fourth walls is configured to be used as a door to access the interior space of said heating unit.

18. The heating unit of claim 11, wherein the first and second walls are pivotally coupled to one another by a hinge and the third and fourth walls are pivotally coupled to one another by a hinge.

19. The heating unit of claim 11, wherein the heat spreading element comprises graphite.

20. A method of manufacturing a heating unit for use in heating a pallet of materials, the method comprising:

constructing first and second wall modules, wherein constructing each of the first and second wall modules comprises:

forming a pliable electrical heating element configured to convert electrical energy to heat energy and to distribute the heat energy, the pliable electrical heating element comprising:

a heat generating element for converting electrical current to heat energy; and a heat spreading element comprising carbon thermally coupled to the heat generating element;

coupling a receiving power connector to the heat generating element, the receiving power connector configured to couple to an electrical power source;

positioning a thermal insulation layer at one side of the pliable electrical heating element;

disposing a plurality of support members at least partially around the edges of the pliable electrical heating element and the thermal insulation layer to provide rigidity to at least a portion of the wall module; and enclosing the pliable electrical heating element, the thermal insulation layer, and the plurality of support members at least partially between first and second cover layers; and forming a seam in the wall module in a fashion that facilitates folding of the wall module to allow the support members to support the wall module on an edge of the wall module;

disposing or forming one or more fasteners in at least one of the cover layers of the first or second wall modules, the fasteners being configured to allow the first and second wall modules to be connected in a fashion such that the first and second modules can be substantially arranged into the sides of a box; and constructing a cover module configured to cover the top of the box and to retain heat in the box.

* * * * *

UNITED STATES PATENT AND TRADEMARK OFFICE
CERTIFICATE OF CORRECTION

PATENT NO.         : 8,258,443 B2
APPLICATION NO.    : 12/119434
DATED              : September 4, 2012
INVENTOR(S)        : Caterina et al.

Page 1 of 2

It is certified that error appears in the above-identified patent and that said Letters Patent is hereby corrected as shown below:

Title Page 2, item (56), Column 1
Line 11, change "4/1973" to --5/1973--
Line 13, change "3,868,825" to --3,865,825--
Line 28, change "Anabtawi" to --Ababtawi--
Line 41, change "5,614,292 A 3/1997" to --4,614,292 A 5/1997--
Line 61, change "Diederich" to --Diedrich--
Line 77, change "12/2003" to --1/2003--

Title Page 2, item (56), Column 2
Line 35, change "Seibert" to --Siebert--

Title Page 3, item (56), Column 2
Line 31, change "May" to --Mar.--

In the Specifications:

Column 1
Line 60, change "combination" to --a combination--

Column 2
Line 19, change "an" to --illustrates an--

Column 3
Line 9, change "plastic metal" to --plastic, metal--
Line 35, change "is network" to --is a network--

Column 4
Line 8, change "embodiment" to --embodiments--

Signed and Sealed this
Eighteenth Day of March, 2014

Michelle K. Lee
*Deputy Director of the United States Patent and Trademark Office*

Column 5
Line 20, change "compressible resilient" to --compressible, resilient--
Line 37, change "and that" to --and--

Column 6
Line 25, change "heating" to --heat--
Line 48, change "used set" to --used to set--

Column 7
Line 26, change "be" to --by-- (second occurrence)
Line 27, change "another other" to --another--
Line 42, change "206" to --160--

Column 8
Line 7, change "110" to --130--
Line 10, change "environment" to --environments--
Line 23, change "connected" to --connect--
Line 24, change "connect" to --connector--

Column 9
Line 13, change "electronic" to --electronically--

In the Claims:

Column 10
Line 51, change "connecter" to --connector--